UNITED STATES PATENT OFFICE.

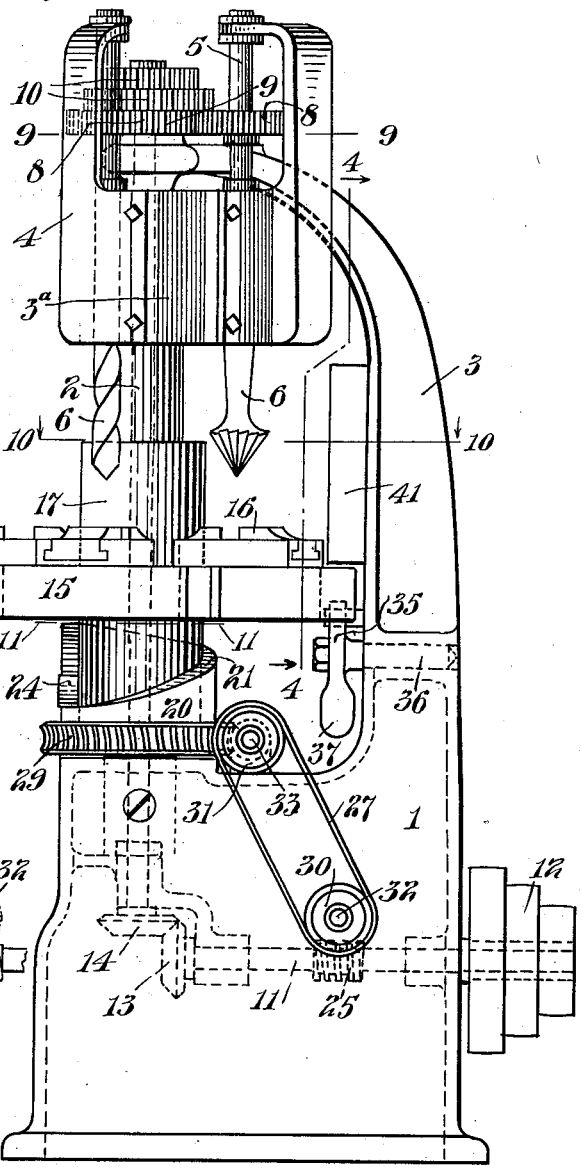

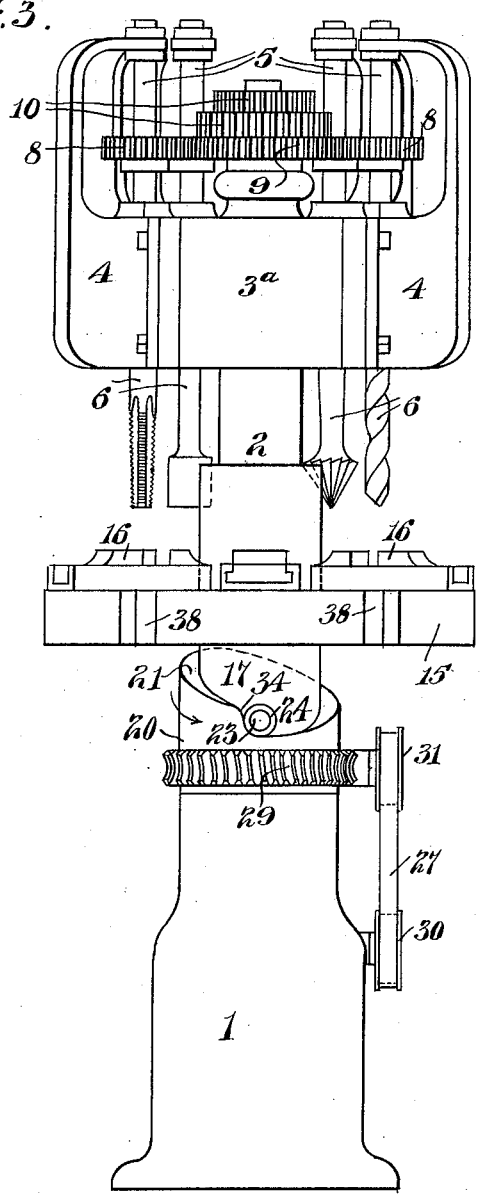

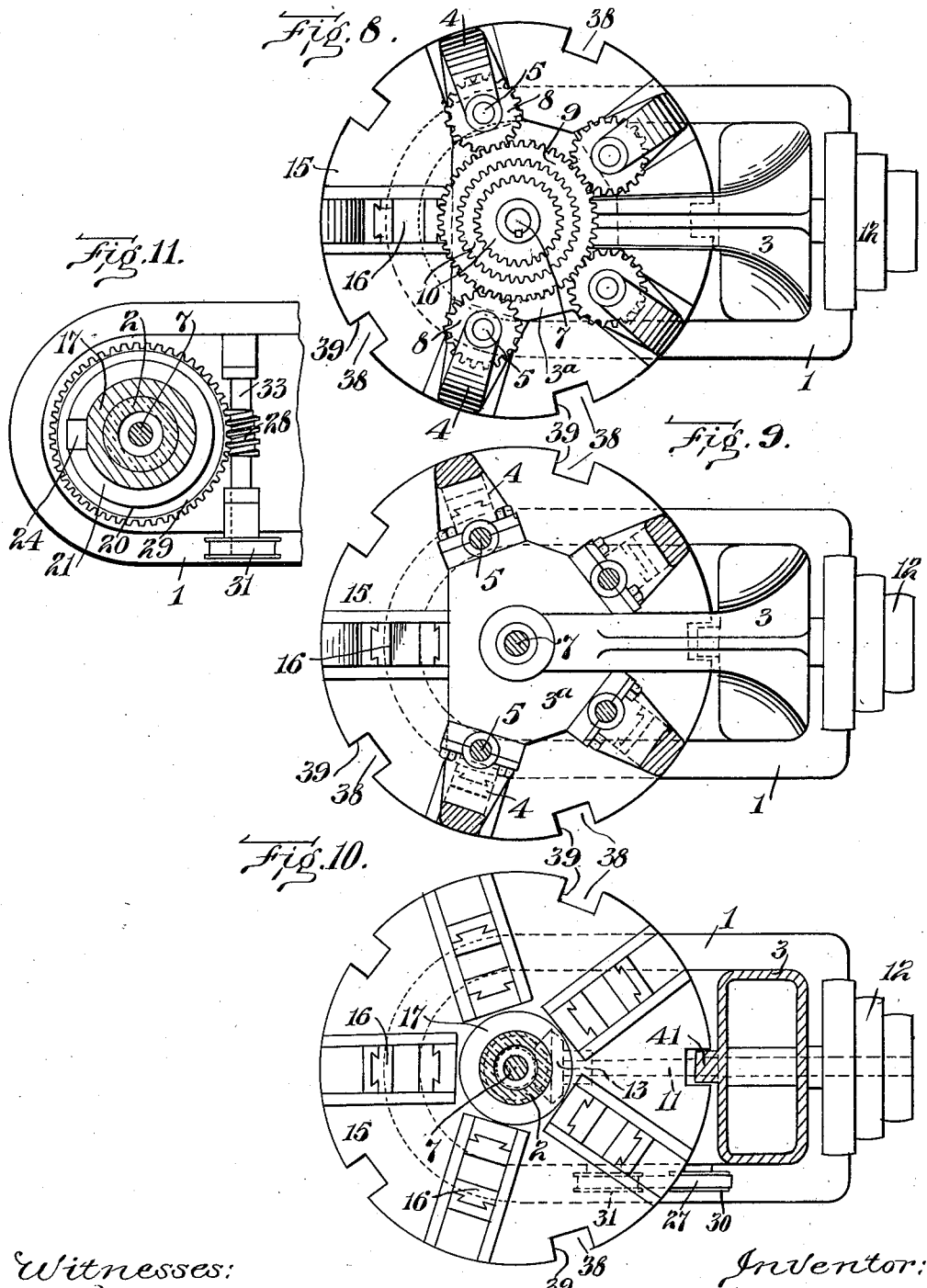

GEORGE O. GRIDLEY, OF WINDSOR, VERMONT.

MACHINE-TOOL.

1,012,630. Specification of Letters Patent. Patented Dec. 26, 1911.

Application filed September 4, 1909. Serial No. 516,181.

*To all whom it may concern:*

Be it known that I, GEORGE O. GRIDLEY, of Windsor, in the county of Windsor and State of Vermont, have invented certain new and useful Improvements in Machine-Tools, of which the following is a specification.

This invention relates to machine tools and particularly to that class of machine tools in which a number of tool elements are simultaneously operated and caused to act at the same time upon a number of pieces of work, preferably to perform different operations which may be either wholly distinct from one another, or successive steps in a connected series of operations.

The main object of the invention is to provide such a multiple-tool machine with a work holder, between which and the means for holding the tools, there is a relative rotating movement provided so as to present the different pieces of work successively to the action of all the tools, and between which and the tool holder there is also an approaching and receding movement provided for to feed the work, together with an improved form of driving and feeding mechanism by which the above-described relative movements are successively produced.

Another object of the invention is to provide a multiple tool or spindle machine arranged vertically, in which the relative feed movement between the work and tools is up and down instead of horizontal.

In the accompanying drawings I have illustrated one embodiment of the invention, in which the work holder is arranged so as to move relatively to the support which holds the tools, and have devised a driving mechanism, which in part both indexes the work holder rotatively and feeds it axially toward the work.

Figure 1 of the drawings represents a side elevation of a machine embodying the principles of my invention. Fig. 2 is a verticle axial section of part of the machine. Fig. 3 is a front elevation of the machine. Fig. 4 is a sectional view of part of the machine on line 4—4 of Fig. 1, looking in the direction of the arrow. Figs. 5, 6 and 7 are fragmentary views showing the work-holding table in different positions and illustrating the action and the means by which rotation of the holder is arrested and feed movement thereof inaugurated. Fig. 8 is a plan view of the machine. Fig. 9 is a sectional plan view of parts below the line 9—9 of Fig. 1. Fig. 10 is a plan view of the work-holding table, showing other parts of the machine in section, on line 10—10 of Fig. 1. Fig. 11 is a horizontal section on line 11—11 of Fig. 1.

The same reference characters indicate the same parts in all the figures.

The machine comprises a base 1 from which arises a column 2. A post 3 rises at the rear of the base and is arched over at its upper portion to join the column 2, thereby stiffening and steadying the latter. Supported upon the column 2 is a head or block 3ª, to which are detachably connected a number of tool spindle brackets 4. These brackets are detachably secured to the block or head 3ª as shown in Fig. 9 and have bearings in which are journaled the tool spindles 5, carrying the several operating tools 6 at the lower ends. The head 3ª and brackets 4 together constitute tool holders, which support the tools with their axes vertical and parallel with the column 2 and also equidistant therefrom. Contained centrally within the column 2 is an operating shaft or spindle 7 for the tools, which carries on its upper end a gear 8, meshing with gears 9, carried by the respective tool spindles. All of the tools are thus geared to the driving shaft and are rotated simultaneously therewith. If desired additional gears 10 of different diameters may be carried by the shaft 7 and change gears adapted to mesh therewith may be substituted on the tool spindle 5 in place of the gears 9, whereby the latter may be driven at a variety of different speeds.

The means for driving the shaft 7 is a horizontal shaft 11, which receives power from a stepped belt pulley 12 and is in geared relation with the shaft 7 by miter gears 13 and 14.

The work holder is a table 15 which carries a number of work-gripping clamps or chucks 16, which is so arranged as to be capable of holding a number of pieces of work in line with the various tools. This table is rigid with a sleeve 17, which surrounds and is capable of moving upon the column 2. Any convenient means for securing the table on the sleeve may be provided, such for instance as the key 18, or set screw 19, or both.

On account of the fact that the tools and work holders are mounted upon the same column or, in other words, that the support for the tools is a column located approximately centrally among the several tools, the thrust of the tools in acting upon the work is taken centrally and the tendency of the tools to spring is reduced to the minimum. Where tools on opposite sides of the post are in action at one time, the thrusts of these tools are balanced and there is no tendency whatever for them to spring. In any case the support which is afforded by the central column and the solid head secured thereon upon which the tools are mounted, is so rigid that no appreciable deviation or springing of the tools is experienced, even when one is used alone. That is the possibility of springing, which would be afforded if the tools were supported by a neck such as the post 3 at one side of the line of thrust, no matter how solid and rigid the construction of such a post might be, is eliminated by the construction here described.

Surrounding the sleeve 17, with sufficient looseness to turn freely thereon, is a driver 20 for the work table, which is preferably a cylindrical cam formed as a sleeve having a cam surface 21, extending or offset in the direction of its axis. This driving cam rests upon a flat bearing 22 on the base 1. A stud 23, projecting from the sleeve or hub 17 of the work table, carries an antifriction roll, 24, which bears against the cam surface 21. The weight of the table and associated parts retains the stud and its roll in normal contact with the cam surface 21 with a yielding force.

Rotation is imparted to the driver 20 from the main shaft 11 before referred to by worm and wheel gearing 25, 26, a belt 27, and a worm 28 engaging a worm wheel 29, secured to or formed integrally with the driver 20. The belt 27 passes over pulleys 30 and 31, secured to the shafts 32 and 33 respectively of the worm wheel 26 and worm 28. Through this gearing, as will be understood, a constant slow rotary movement is given to the driver 20.

The cam portion of the driver 20 is so shaped as shown in Fig. 3 as to form a shoulder 34, which is sufficiently abrupt as to impart rotation to the work table when it encounters the stud 23 at all times except when the table is positively restrained against rotation. Thus the force which yieldingly resists riding of the stud 23 by the shoulder 34, which is due to the weight of the table, is greater than the normal frictional resistance of the table to rotation and consequently the tendency of this shoulder is to carry the table rotarily with it. I provide, however, means for periodically arresting the rotary movement of the table so that it is positively prevented from turning and is thus constrained to move axially, the inclination of the cam surface, even at its most abrupt portion, being sufficient to enable the roll 24 to ride over it when rotation of the table is no longer permitted. The means for so arresting the rotation of the table and converting its movement into axial translation is a stop dog or detent 35, pivoted at 36 to the front side of the post 3. This dog has attached to it a weight 37 which tends to hold the dog in the position shown in Fig. 5. The location of the dog relatively to the table is such that it lies just within the periphery of the table as shown in Figs. 1 and 6 and is pressed down by the under surface of the table in the position shown in Fig. 6. In the periphery of the table are several notches 38, the sides of which constitute abutments 39. When one of these notches passes over the end of the dog 35, this end is allowed to slip into the notch owing to the fact that the weight moves the dog from the position shown in Fig. 6 to that shown in Fig. 7, whereby the end of the dog engages the abutment 39 of that particular notch. As the table continues to travel in the direction of the arrow shown in Fig. 7, it tilts the dog into the position in Fig. 4 until the dog engages the stop pin 40, whereupon further tilting is prevented and the table is brought to rest. In line with the notch in this position of the table is a guide 41 which projects forwardly from the column 3 and is arranged parallel with the axis of rotation of the table. When the table is thus brought positively to rest, the continuing rotation of the cam driver causes the table to rise (by passing under the stud 23) until the notch embraces the guide 41. The latter continues to hold the table against rotation and further movement of the latter is merely a rectilinear translative feed movement toward the tools. At this time the weight 37 swings the dog 35 into its normal position shown in Fig. 5, in which position the end is at one side of the notch in the table. When the table again descends it strikes the end of the dog with its under surface and deflects the latter as shown in Fig. 6. Thereupon the table, having now entirely left the guide 41 is free to rotate as soon as the shoulder 34 of the cam comes into contact with the stud 23. In this manner the table is intermittently indexed so as to present the work pieces successively to the action of the several tools, and as soon as the indexing movement is complete, the feed movement automatically begins and is carried forward by the same means as that which caused the indexing.

Preferably the number of tool-holding brackets is one less than the number of work-gripping chucks on the table, so that opportunity is given for a removal of a finished piece and the insertion of a blank, while the tools are operating on the other pieces. The work-holding chucks are spaced equidistantly from one another and the tool brackets are correspondingly spaced, whence one space is left of double width as shown in Figs. 8 and 9, giving access for the removal of finished work and the insertion of blanks.

The indexing and feeding principle hereinbefore described may be applied to a machine in which the axis is horizontal or inclined as well as vertical, as here shown, it being only necessary to provide some means for applying a yielding force to perform the action which gravity performs in this instance. It is also possible to reverse the relative situation of the work holder and tool holder, either in position or in mode of operation, so that the tool holder instead of the work holder may be made to revolve and to approach the other. I accordingly desire it to be understood that I do not limit my invention to the particular construction and arrangement illustrated and described in this specification, but hold reversals and other alterations within the scope thereof.

I claim:—

1. A machine tool comprising a tool holder, a work holder having provisions for carrying a plurality of work pieces, means for producing both a relative feed movement of one holder toward the other, and a relative rotation thereof to place successive work pieces in position to be operated on by the same tool, a trip, and means for causing such trip to engage a part of the movable holder during its rotation for arresting such relative rotation, said means also causing the trip to be engaged by another part of the movable holder on its return from its feed movement and to be thereby made inoperative.

2. In a machine tool comprising a tool-holder, and a work-holder, one of which is movable toward and from the other and also rotarily with respect thereto for indexing, a guide for preventing the rotation of the movable holder when moving axially, so arranged that the movable holder is out of engagement therewith when most remote from the other holder, a trip, means for causing said trip to engage the movable holder and interrupt the indexing movement thereof, and means for causing the movable holder, upon return to indexing position, to make such trip inoperative, whereby to permit further indexing.

3. In a machine tool comprising a tool-holder and a work holder, one of which is movable toward and from the other and also rotarily with respect thereto for indexing, a guide for preventing the rotation of the movable holder when moving axially, so arranged that the movable holder is out of engagement therewith when most remote from the other holder, and a trip normally bearing against the movable holder beside the path of movement of a shoulder thereon, and yieldingly actuated to engage said shoulder and arrest the rotation of the holder, said trip being further so arranged as to be displaced by the holder, on its return to indexing position, into its position beside the path of the shoulder.

4. A machine tool comprising a tool holder, having provisions for supporting a plurality of tools, a work holder having provisions for supporting a plurality of work pieces, one of said holders being rotatable for indexing, a rotary driving member for said holder having a cam portion arranged to rotate the rotatable holder, and an abutment automatically operative to stop the rotation of said holder and cause the cam portion of said driving member to move the rotatable holder toward the other holder, said abutment being also arranged in the path of the rotatable member upon return to indexing position, whereby it is rendered inoperative by the said member.

5. A machine tool comprising work and tool holders, one of which is rotatable and axially movable, mechanism for rotating the latter, a stop arranged to engage said movable holder and prevent rotation thereof, and means whereby said movable holder renders said stop inoperative.

6. A machine tool comprising work and tool holders, one of which is rotatable and axially movable, means for rotating the latter including a rotary cam, a stop automatically operative to arrest the rotation of said holder, whereby said cam is constrained to move the holder axially, and a guide arranged to engage said holder after the same has moved clear of the stop, to restrain its rotation thereafter.

7. A machine tool comprising a tool holder and a work holder, having means for securing a plurality of work pieces, one of which is movable, both rotarily, and axially toward and from the other, a guide parallel to the direction of axial motion of said holder, an abutment on the movable holder adapted to engage said guide, and a stop arranged adjacent to said movable holder in such position as to be engaged by the holder to arrest the rotation of the holder and cause it to be moved axially when its abutment is in alinement with the guide.

8. A machine tool comprising a tool holder and a work holder, one of which holders is movable relatively to the other, both rotarily and rectilinearly, means for turning the movable holder, a dog mounted adjacent to such movable holder and arranged to engage an abutment thereof to arrest the rotation of the holder whereby the latter is caused to move axially, and a stationary guide with which said abutment of the holder engages after a slight axial movement.

9. A machine tool comprising a tool holder and a work holder, one of which holders is movable relatively to the other, both rotarily and rectilinearly, a pivotally mounted dog or trip arranged so as to engage an abutment of said table to stop the rotation thereof, and a guide with which an abutment is engaged and by which the holder is constrained to move rectilinearly toward the other holder.

10. A machine tool comprising a tool holder and a work holder, one of which holders is movable relatively to the other both rotarily and rectilinearly, said holder having a plurality of guide grooves parallel to its axis, a dog movably mounted adjacent to said holder in position to enter said grooves when the latter are brought into the vicinity thereof, during the rotation of the holder, whereby the rotation of the holder is arrested and translative movement thereof is produced, and a stationary guide parallel to the axis of said movable holder arranged to be embraced by the groove of the latter upon the axial movement thereof.

11. A machine tool comprising a tool holder and a work holder arranged one above the other, the lower of the two holders being rotatable in a horizontal plane and also movable vertically, a weighted dog pivotally mounted beneath said movable holder and arranged so that its weighted portion is displaced by the holder, so that said dog is adapted to enter a notch of the holder, and a stationary guide arranged vertically above said dog.

12. A machine tool comprising a tool holder and a work holder arranged one above the other, the lower of the two holders being rotatable in a horizontal plane and also movable vertically, said holder having a number of abutments, and a dog located beneath said movable holder and arranged to press upwardly against the under surface of the latter, whereby to engage the abutments thereof and arrest the rotation of the holder.

13. A vertically arranged multiple spindle machine tool comprising a tool holder carrying a plurality of vertically arranged operating tools, a work-holding table mounted beneath said tool holder, with provisions for rotating horizontally, and reciprocating vertically, a dog mounted beneath the table near the periphery thereof, and weighted so as to bear against the under surface thereof, said table having notches into which the end of said dog is adapted to be raised by the weighted portion thereof and, by engagement of which with the dog, rotation of the table is prevented, and a guide vertically alined with said dog for guiding the table when the latter is raised by the cam driver above the dog.

14. A vertical machine tool comprising a tool holder having vertically arranged tools, a work-holding table arranged beneath said tool holder and mounted so as to be rotatable horizontally and rectilinearly movable vertically, said table having a number of shoulders at its periphery, a weighted dog pivotally mounted beneath said table near the periphery thereof, and caused by its weighted portion to bear upwardly against the under surface of the table so as to engage said shoulders as the latter come adjacent thereto, a stop located beside said dog to limit the pivotal movement thereof and arrest the rotation of the table, and a vertical guide arranged to be engaged by a shoulder of the table as the latter moves up and down, the dog being arranged at such an angle with respect to its weighted portion that upon lowering of the table the shoulder which was last engaged with the dog overlies the latter and depresses it.

15. In a machine of the character described a horizontally rotatable and vertically movable table, a dog pivoted beneath said table and having a weighted arm extending at an angle thereto, a vertical guide arranged above said dog, and abutments on the table projecting outward beyond the dog, said dog and its weighted arm being arranged relatively to the table so that when one of said shoulders is engaged with said guide the dog projects beyond the path of movement of the shoulder, and when the table is in its rotating position, it bears upon the dog and displaces the weighted arm thereof from its lowermost position.

In testimony whereof I have affixed my signature, in presence of two witnesses.

GEORGE O. GRIDLEY.

Witnesses:
 ALBERT E. RUST,
 P. W. PEZZETTI.